May 6, 1924.
W. ROTTER ET AL
GOVERNOR MECHANISM
Filed Feb. 9, 1922
1,492,938
3 Sheets-Sheet 2
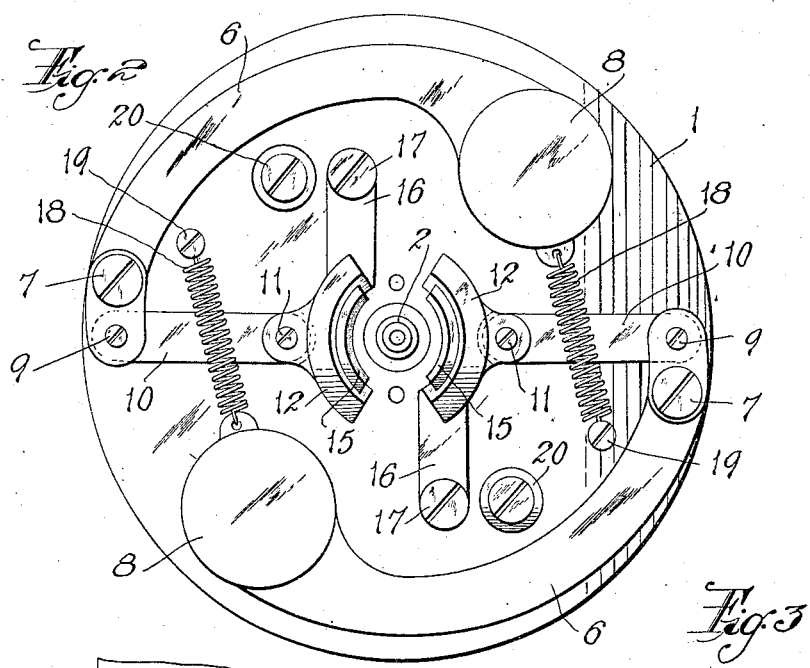
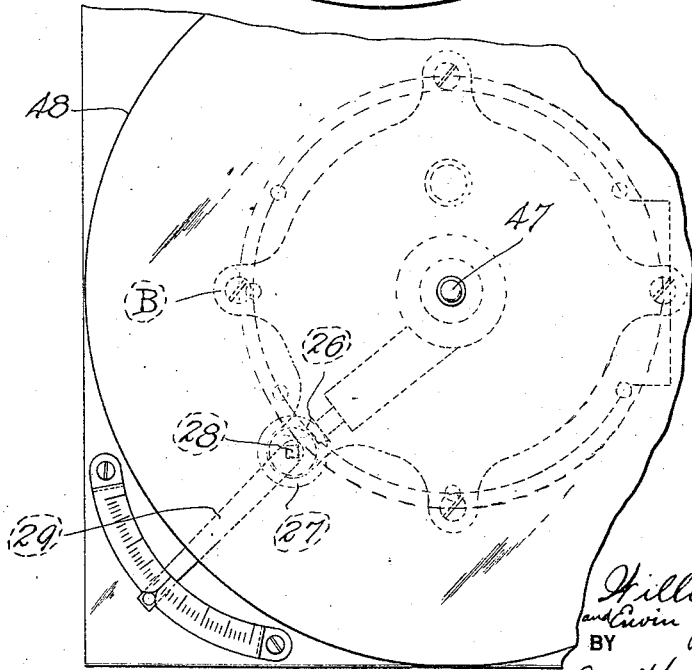
INVENTORS
William Rotter,
and Erwin J. Panish,
BY
Everett H. Rook,
ATTORNEYS.

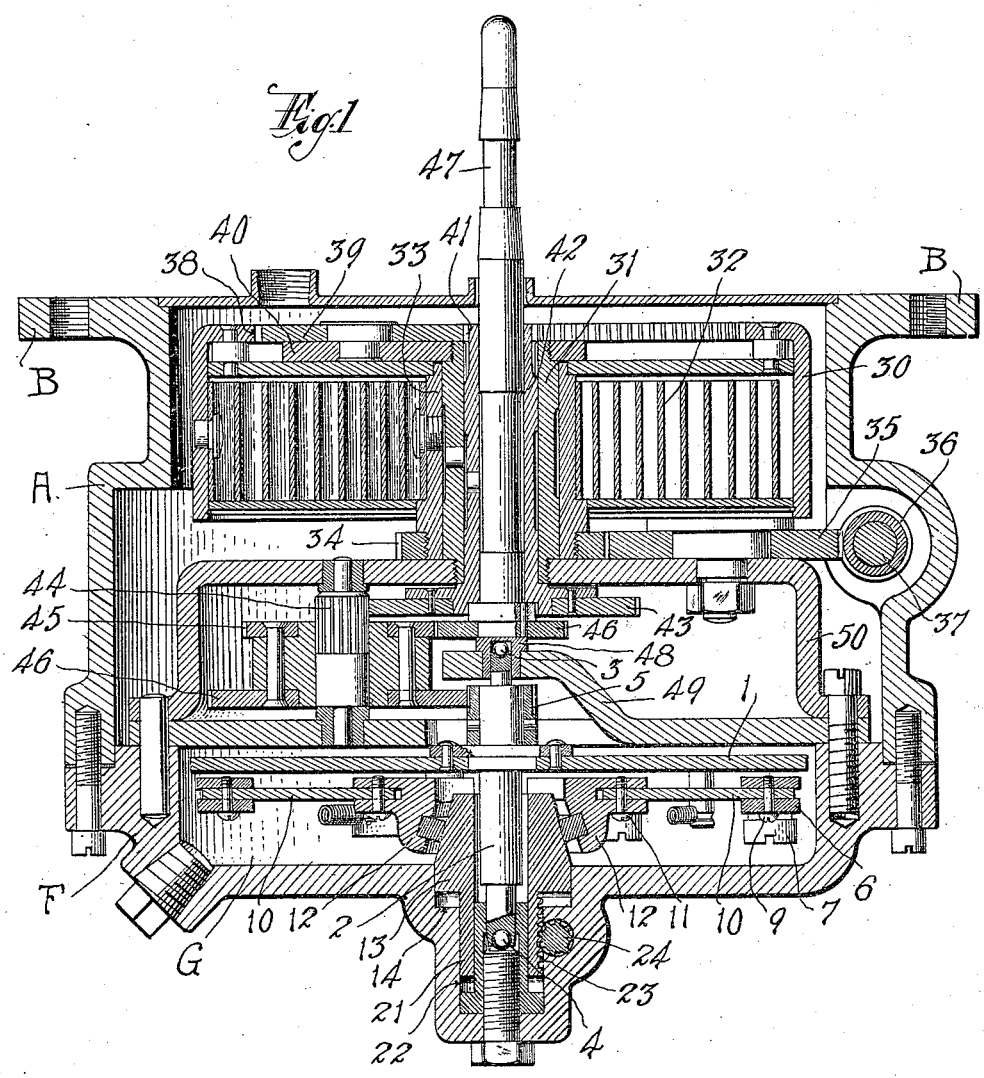

May 6, 1924.

W. ROTTER ET AL 1,492,938

GOVERNOR MECHANISM

Filed Feb. 9, 1922

INVENTORS:
William Rotter and
Erwin J. Panish,
BY
Everett Rook,
ATTORNEYS.

Patented May 6, 1924.

1,492,938

UNITED STATES PATENT OFFICE.

WILLIAM ROTTER, OF NEW YORK, AND ERWIN J. PANISH, OF BROOKLYN, NEW YORK; SAID PANISH ASSIGNOR TO SAID ROTTER.

GOVERNOR MECHANISM.

Application filed February 9, 1922. Serial No. 535,189.

*To all whom it may concern:*

Be it known that we, WILLIAM ROTTER and ERWIN J. PANISH, both citizens of the United States, and residents, respectively, of New York, in the county of New York and State of New York, and Brooklyn, in the county of Kings and State of New York, have invented new and useful Improvements in Governor Mechanism, of which the following is a specification.

This invention relates in particular to motors for sound reproducing machines of the type described in our co-pending application, Serial No. 499,457, filed September 9, 1921, one object of the invention being to provide a simple, accurate and efficient governor mechanism for regulating the speed of revolution of the turn table shaft by means of which the speed of revolution of the turn table shaft can be quickly and accurately increased or decreased, thereby eliminating the common deficiency of well known types of governors in slowness of pick-up of speed on a change from a low to a higher speed and "choking" or slowing temporarily to a lower speed than desired and gradually increasing or recovering on a change from a high to a lower speed.

Further objects of the invention are to provide a governor mechanism of the character described comprising a revoluble body having centrifugally actuated governor weights thereon, a friction element arranged coaxially with said revoluble body, and brake shoes carried by said revoluble body adapted to engage said friction element and connected by compound leverage to said governor weights, whereby said brake shoes are forced into engagement with the said friction element by centrifugal action on said governor weights and the power set up in said weights by said centrifugal force is multiplied by said compound leverage; to provide in such a governor mechanism novel means for controlling the amount of power exerted by said governor weights through said brake shoes on said friction element to regulate the speed of revolution of the said body; to thus provide means for controlling the extent of centrifugal movement of said governor weights; to provide means for gradually varying the area of frictional contact between said brake shoes and said friction element to vary the speed of revolution of the governor body; to provide a governor mechanism including a body rotatable on a vertical axis and having horizontally swinging centrifugal governor weight levers pivoted thereon between their ends, said levers having weights at one end, a friction element arranged coaxially with said body between said governor weights, and brake shoes adapted to engage said friction element and connected to the ends of the corresponding governor weight levers opposite said weights; to form said friction element with a frusto-conical bearing surface and provide means for moving the same axially of said body, and to obtain other results and advantages as may be brought out by the following description.

Referring to the accompanying drawings, in which like numerals of reference indicate the same parts throughout the several views, Figure 1 is a vertical longitudinal sectional view through a spring motor embodying the invention;

Figure 2 is a detached bottom plan view of the governor disk, weight members and brake shoes;

Figure 3 is a fragmentary top plan view of the motor applied to a motor board;

Figure 4:
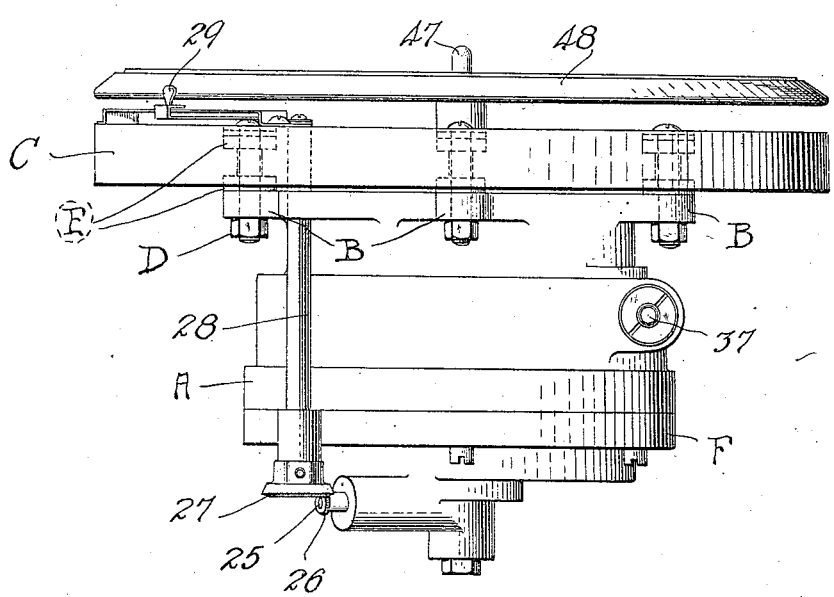
Figure 4 is a side elevation of the motor suspended from a motor board.
Figure 5:
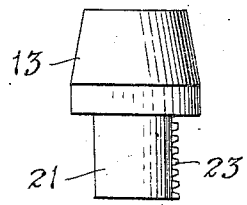
Figure 5 is a detached side elevation of the governor friction element.

The governor is shown in connection with a spring motor for phonographs which includes a substantially cylindrical casing A provided with radial lugs B at one end and adapted to be suspended on a vertical axis from a motor board or other suitable support C by means of bolts D passing through said lugs and the motor board. Vibration insulating washers E are interposed between the motor board and the casing A and between the bolts D and the motor board. The lower end of the casing A is closed by a removable base piece F formed with a recess G coaxial with the casing in which is mounted the governor mechanism.

The governor mechanism comprises a circular disk or body 1 rigidly secured to a coaxial shaft 2 journaled at its ends on ball thrust bearings 3 and 4 on a vertical axis. The governor disk 1 is driven from the motor by means of a pinion 5 secured to the shaft 2 and geared in a manner hereinafter described to the motor gearing.

A pair of governor weight levers 6 are pivotally mounted at intermediate points in their lengths on axes parallel to the axis of the disk 1, as at 7, at diametrically opposite points on the underside of the disk, the pivot points 7 being closer to one end of the levers 6 than the other ends thereof. The longer arms of the weight levers 6 are enlarged or weighted as at 8 so as to be swung outwardly by centrifugal action when the disk is revolved, and the other ends of the weight levers are pivotally connected at 9 to one end of links 10, the opposite ends of which are pivotally connected at 11 to opposed brake shoes 12. A friction element 13 which is substantially frusto-conical, is longitudinally slidably mounted in an axial recess 14 communicating with the recess G, so that the said friction element is co-axial with the governor disk 1. The brake shoes 12 are provided with friction surfaces 15, such as felt, which are arcuate in shape and of a radius substantially equal to the largest radius of the frusto-conical friction element 13. The brake shoes 12 are provided with lateral arms 16 which are pivotally mounted at 17 to the underside of the disk, and with this construction it will be observed that when the weight arms of the weight levers 6 are thrown outwardly by centrifugal action, the brake shoes 15 will be forced into engagement with the surface of the frusto-conical friction element 13 so as to serve as brakes and resist revolution of the governor disk 1. The difference in length of the weight arms and the other arms of the weight levers multiplies the power developed in the weight arms by centrifugal action, and the brake shoes are thus forced into engagement with the friction element with a force much greater than the centrifugal force in the weight arms. The pivoting of the brake shoes at 17 in connection with the links 10 ensures the minimum amount of eccentric action of the brake shoes on the friction element 13. Tension springs 18 are connected between the extremities of the weight arms of the weight levers and studs 19 on the governor disk to normally draw the weight arms inwardly of the disk and resist centrifugal action on the weight arms. Resilient buffers 20 are provided for limiting the inward movement of the weight arms.

In the operation of the governor, it will be observed that when the friction element 13 is moved to position the surface at the greatest radius thereof opposite the brake shoes 15, outward movement of the weight arms of the weight levers is resisted to the greatest degree, and that the entire area of the friction surfaces of the brake shoes are in engagement with the friction element. The tension of the springs 18 when the governor weights are in this position, is also at the minimum, so that outward movement of the governor weights 8 meets little resistance from said springs. Thus, the governor disk 1 will revolve at the minimum speed due to the maximum area of frictional contact between the brake shoes and friction element 13 and the maximum pressure upon the brake shoes through centrifugal action on the governor weights. As the friction element 13 is moved downwardly the brake shoes are permitted to move inwardly toward each other under the influence of centrifugal action on the governor weights. At the same time the tension of the springs 18 is increasing and the area of contact of the brake shoes with the friction element is decreasing, so that the speed of revolution of the governor disk 1 will increase. Under these conditions it will be seen that the centrifugal force developed in the weights 8 is being stored up in the springs 18 so that a comparatively less pressure is exerted by the brake shoes on the friction element than when the brake shoes are in engagement with the friction element at its greatest diameter. A governor mechanism constructed as above described will effectively operate to accurately and quickly change the speed of revolution of a motor at a slow speed of revolution, it having been found that the governor mechanism will efficiently operate with the governor disk revolving at speeds 50 to 60 per cent lower than the average speeds of the heretofore known governor mechanism. The whole governor mechanism can also be made of a minimum weight, whereby a minimum amount of power is necessary to operate the same and a minimum amount of wear and tear is incident to its operation.

Any suitable means may be utilized for moving the friction element 13, but in the present instance the friction element is shown as provided with an extension 21, slidable in a recess 22, one side of said extension being formed with a rack 23 meshing with a pinion 24 carried by a shaft 25 journaled in the bottom piece F of the casing. The outer end of the shaft 25 is provided with a bevel pinion 26 which meshes with a bevel gear 27 on a vertical shaft 28 which projects upwardly through the motor board C and is provided with an operating lever 29. When the operating lever 29 is swung the shaft 28 is rotated and this motion is transmitted through the gears 27 and 26 and the pinion 24 to the extension 21 so as to slide the friction element 13 in one direction or the other.

One type of motor with which the governor mechanism above described can be efficiently used comprises a spring casing 30 revolubly mounted on a tubular post 31 rigidly mounted coaxially in the casing A, said spring casing having mounted therein a spiral spring 32 one end of which is connected to the spring casing and the other end of which is connected to a winding sleeve 33 revolubly mounted on the rigid post 31 and having at one end a spiral gear 34, meshing with an idler spiral gear 35, which in turn meshes with a spiral gear 36 mounted on a winding shaft 37 to one end of which is adapted to be applied a winding crank (not shown). The spring casing 30 is formed with an internal gear 38 which meshes with an idler gear 39 mounted on a bracket 40 on the tubular post 31, said idler gear 39 meshing with a pinion 41 carried by a sleeve 42 journaled within the post 31 and carrying at one end a gear 43. The gear 43 meshes with a pinion 44 rigidly connected to a gear cluster comprising gears 45 and 46, the latter of which meshes with the pinion 5 on the governor shaft 2 to drive the governor mechanism. The other gear 45 meshes with a pinion 46 secured to the inner end of a turn table shaft 47, the other end of which projects outwardly through the upper end of the casing A and receives a turn table 48. The inner end of the turn table shaft 47 is mounted on a thrust bearing 48 supported on a bracket 49 in substantially axial alinement with the governor shaft 2. The post 31 is shown as mounted on a gear casing 50 removably mounted on the upper side of the base piece F of the casing A. With this construction the motor can be quickly assembled and disassembled by removing the base piece F, and the governor mechanism is made readily accessible by detaching the gear casing 50 from said base piece.

While we have shown and described one possible embodiment of our invention it will be understood that this is only for the purpose of illustrating the principles of the invention, and that many modifications and changes can be made in the detail construction of the motor and governor without departing from the spirit or scope of the invention. Therefore, we do not desire to be understood as limiting ourselves except as required by the following claims when construed in the light of the prior art.

Having thus described the invention, what we claim is:

1. A governor including a revoluble body, a governor weight mounted thereon and adapted to be actuated by centrifugal action, a circular friction surface having portions of different diameters, and an arcuate brake shoe actuated by said governor weight and adapted to engage said friction surface, said brake shoe and said friction surface being relatively movable and the radius of said brake shoe corresponding with the radius of one portion of said friction surface, said brake shoe having a different radius from other portions of said friction surface, whereby the area of contact of said brake shoe and said friction element is varied upon relative movement thereof.

2. A governor including a revoluble body, a governor weight mounted thereon and adapted to be actuated by centrifugal action, a circular friction surface having portions of different diameters, and an arcuate brake shoe actuated by said governor weight and adapted to engage said friction surface, said friction surface being movable axially, the radius of said brake shoe corresponding with the radius of one portion of said friction surface and said brake shoe having a different radius from other portions of said friction surface, whereby movement of said friction surface varies the area of contact of said surface with the brake shoe.

3. A governor including a revoluble body, a governor weight mounted thereon and adapted to be actuated by centrifugal action, a brake shoe, means for connecting said brake shoe to said weight so that the shoe is actuated toward the axis of said body by said weight, a frusto-conical friction element arranged coaxially with said body, and means for causing relative movement of said brake shoe and said friction element parallel to said axis, said brake shoe being arcuate and of a radius corresponding to the radius of said friction element at one point in its length and having a different radius from said friction element at other points, whereby relative movement of said brake shoe and said friction element varies the area of contact thereof.

4. A governor including a revoluble body, a governor weight mounted thereon and adapted to be actuated by centrifugal action, a brake shoe, a friction element to be engaged by said brake shoe, one of said friction element and brake shoe being frusto-conical and the other arcuate and of a radius the same as the radius of the other said frusto-conical member at one point in its length and of a different radius from said frusto-conical member at other points, means for causing relative movement of said brake shoe and said friction element to vary the area of contact therebetween and the extent of movement of said weight under centrifugal action, and a spring for yieldingly resisting centrifugal action on said weight.

WILLIAM ROTTER.
ERWIN J. PANISH.